United States Patent
Smith

(10) Patent No.: US 6,587,557 B1
(45) Date of Patent: Jul. 1, 2003

(54) SYSTEM AND METHOD OF DISTRIBUTING OUTBOUND TELEPHONY SERVICES OVER A COMPUTER NETWORK

(75) Inventor: B. Scott Smith, Londonderry, NH (US)

(73) Assignee: Concerto Software, Inc., Westford, MA (US)

( * ) Notice: Subject to any disclaimer, the term of this patent is extended or adjusted under 35 U.S.C. 154(b) by 0 days.

(21) Appl. No.: 09/391,254

(22) Filed: Sep. 7, 1999

(51) Int. Cl.[7] .............................................. H04M 3/00
(52) U.S. Cl. ........................ 379/265.01; 379/265.09; 379/266.07; 379/266.1; 379/309; 379/266.08
(58) Field of Search ....................... 379/265.01, 265.02, 379/265.09, 265.1, 265.11, 265.12, 265.13, 266.04, 266.07, 266.08, 266.09, 266.1, 309

(56) References Cited

U.S. PATENT DOCUMENTS

| | | | | |
|---|---|---|---|---|
| 5,796,791 A | | 8/1998 | Polcyn ........................ 379/265 |
| 5,825,870 A | | 10/1998 | Miloslavsky ................ 379/265 |
| 5,848,143 A | | 12/1998 | Andrews et al. ............ 379/265 |
| 5,883,891 A | | 3/1999 | Williams et al. ............ 370/356 |
| 5,889,799 A | | 3/1999 | Grossman et al. .......... 379/266 |
| 6,046,762 A | * | 4/2000 | Sonesh et al. .............. 379/265 |
| 6,175,564 B1 | * | 1/2001 | Milosavsky et al. ........ 370/352 |
| 6,278,776 B1 | * | 8/2001 | Mark et al. .................. 379/265 |
| 6,285,752 B1 | * | 9/2001 | Rice ....................... 379/266.07 |
| 6,373,836 B1 | * | 4/2002 | Deryugin et al. ...... 379/265.03 |
| 6,404,885 B1 | * | 6/2002 | Field et al. ............ 379/266.04 |
| 6,411,805 B1 | * | 6/2002 | Becker et al. ......... 379/209.01 |

* cited by examiner

Primary Examiner—William J. Deane, Jr.
(74) Attorney, Agent, or Firm—Bourque & Associates, PA

(57) ABSTRACT

A system and method of distributing outbound telephony service including voice communications over a computer network is provided. The system includes a master call center, including a computer telephony integration (CTI) system and a digital communication server, located at a first location. The system further includes at least one distributed call center, including a distributed CTI system and a digital communications server, located at at least one remote location. The system is configured to connect at least one connected party with whom voice communications are established at a distributed call center over a local telephone line and then route the voice communications to at least one call center agent interfacing the master call center over a computer network, such as the Internet. The method begins by linking a master call center to at least one distributed call center over a computer network. Next, at least one call list group is distributed to the distributed call center. Then, an outbound call campaign is initiated at the distributed call center over standard, voice telephone lines. Upon reaching a live, "connected" party, the connected call is routed to at least one master call center agent over a computer network.

20 Claims, 3 Drawing Sheets

SYSTEM AND METHOD OF DISTRIBUTING OUTBOUND TELEPHONY SERVICES OVER A COMPUTER NETWORK

FIELD OF THE INVENTION

This invention relates to computer telephony systems and more particularly to a system and method of distributing outbound telephony services over a computer network.

BACKGROUND OF THE INVENTION

Automated telephone systems are used extensively to both place and receive telephone calls. For example, airline reservations systems and banks may utilize the inbound or call receiving features of an automated telephone system, while marketing groups and credit collection departments would utilize the outbound calling features of the system. In a typical outbound calling scenario, a call campaign will be initiated at a call center using a sophisticated system that combines telephone switching and computer information processing technologies. These sophisticated systems are commonly referred to as computer-telephony-integration (CTI) systems.

A CTI system will typically receive a call list associated with a call campaign from a host computer or other source of call records for the campaign. A call record includes information regarding a potential customer, including a telephone number that can be dialed by the CTI system in order to contact the potential customer. Associated with a call center is a plurality of call center agents. These call center agents each utilize work stations, which communicate, electronically through the CTI system to one or more host computers in-order to provide an agent with information regarding a call record and information regarding the purpose of a call, such as a script or the like.

CTI systems routinely include predictive dialers, which are well known in the art and enable a call canter to maximize the utilization of call center agents by automatically dialing telephone numbers associated with call records according to a simple or sophisticated call pacing algorithm. CTI systems also include call classifiers, which are able to readily detect busy signals, answering machines, voice mail, as well as telephone calls that are answered by a live person. When the call classifier detects a live person, the CTI system substantially immediately connects the live person or contacted party to an available call center agent. As can be appreciated, a finely tuned predictive dialer will attempt to pace the initiation of outbound calls so that an agent is always available to answer a call to a connected party while, at the same time, ensuring that there is not an abundance of unutilized agents at any particular time.

Typically, call centers contract with telecommunications service providers in order to obtain preferential rate structures, since call centers generate hundreds or thousands of calls per hour. Accordingly, a significant cost associated with the operation of a call center is telecommunications line charges.

In the recent past, a number of companies have developed and are marketing computer hardware and software products which permit computer users to talk to each other using voice communication and their computers over the Internet. The Internet is a network using digital data and a large number of computers which communicate with each other over various types of communications channels, including data telephone lines, such as integrated services digital network (ISDN) channels. Since most computer users either connect directly to the Internet or access the Internet via an internet service provider (ISP) using a local telephone line, the costs associated with voice communications over great distances is greatly reduced. However, one significant drawback associated with voice communications over the Internet is that the parties conducting such communications must pre-arrange to do so and be available at their respective computers at the designated time.

In order to overcome the difficulties associated with pre-arranging voice communications, hybrid Internet-based telecommunications systems and services have been developed. These systems allow a party wishing to place a long distance telephone call to initiate the call by establishing communications with a local link to the Internet. Then, the call request is forwarded over the Internet to a telecommunications provider at a locale substantially coinciding with the locale of the destination of the desired telephone call. The destination telecommunications company then establishes local voice telephone line communications with the destination party and connects the initiating party with the destination party over the Internet when the destination party answers the initiated call. However, one drawback associated with this type of system is that it relies, in part, on establishing working relationships with any number of telecommunications companies around the world. In addition, in a call center environment, the number of initiated calls in an out-bound call campaign is significantly larger than the number of calls actually connected. Accordingly, the sheer volume of digital data being transmitted to and from a call center over the Internet could result in performance degradation upon the system.

Therefore, what would be desirable to a call center initiating outbound call campaigns would be a system and method of distributing outbound telephony services, and, in particular, the predictive dialing function to a plurality of distributed call centers over a computer network. In this manner, the high overhead associated with the sheer number of calls initiated by a predictive dialer will be distributed to the distributed call centers and only live answers or connected calls will result in actual voice communications being transmitted over the computer network to a call center agent located at a master call center or at a slave call center or remote agent connected to a master call center.

SUMMARY OF THE INVENTION

The disclosed invention provides a system and method of distributing outbound telephony services including voice communications over a computer network. The system includes a master call center located at a first location. The master call center includes a computer telephony integration (CTI) system, and a digital communication server connecting the CTI system to a computer network.

Also included is at least one distributed call center located at at least one remote location. Each distributed call center includes a distributed CTI system and a digital communications server. The system is configured to connect at least one connected party with whom voice communications are established at a distributed call center over a local telephone line connecting the connected party and at least one call center agent interfacing the master call center, wherein the voice communications are conducted over the computer network.

The disclosed method of distributing outbound telephony services over a computer network begins by linking a master call center to at least one distributed call center over a computer network. The master call center includes a master CTI system and at least one master call center agent for handling voice communications with a connected party. Each distributed call center includes a distributed CTI system.

Next, at least one call list group is distributed to the distributed CTI system at a distributed call center. Each distributed call center preferably corresponds generally to a geographic parameter associated with the call records included in the call list group. Then, an outbound call campaign is initiated at the distributed call center over standard, voice telephone lines. Upon the answering of an outbound call by a live party, the connected party is connected to the distributed CTI system over the voice telephone line. Finally, the method includes establishing voice communications between the connected party and the master call center and, in particular, a call center agent over the computer network.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

The present invention will be described making particular references to voice communications. However, it should be understood that the invention is equally applicable to any data contact method which is less costly to make locally and where a contactee may be unavailable or busy, such as cellular communications, pager messages, fax transmissions, video feeds, netmeetings and others.

Figure 1:
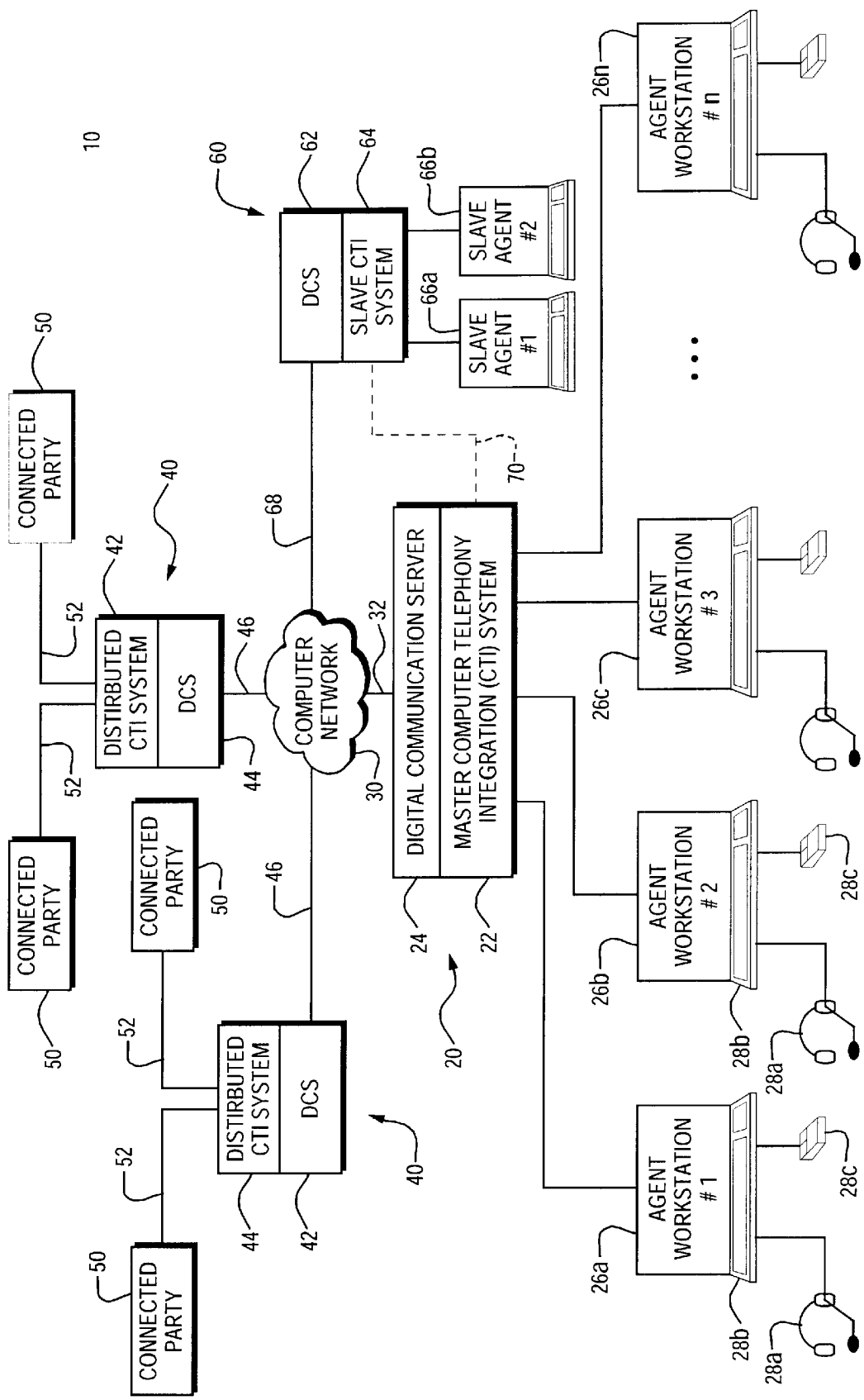
FIG. 1 is a block diagram of the major components of a system for distributing outbound telephony services over a computer network according to one embodiment of the invention.

Turning now to the figures, and in particular, FIG. 1, one embodiment of a system for distributing outbound telephony services, over a computer network is shown. The system 10 includes a master call center 20 located at a first location. The master call center 20 includes a computer telephony integration (CTI) system 22 and a digital communication server 24. The digital communication server 24 interfaces the master call center 20 with a computer network 30, which, in the preferred embodiment, comprises the Internet. However, any suitable wide area network (WAN) would be considered an equivalent.

In the embodiment shown, the master call center 20 also includes one or more call center agent work stations 26 which interface with the master CTI system 22 and allow one or more master call center agent to handle telephone calls placed to interested parties via the master CTI system 22. Each agent work station 26 includes a number of input/output devices 28, such as agent headset 28a, keyboard 28b and mouse 28c. It is envisioned that each agent workstation may also have additional audio-visual input/output devices such as full motion video cameras and the like. Nonetheless, all that is required is sufficient input/output capabilities to allow an agent to conduct voice communications with a connected party and receive and transmit relevant data related to a connected call to and from the master CTI system.

While, in the embodiment shown in FIG. 1, each agent workstation 26 is physically co-located at the first location, as is well known in the art, remote agents may access a CTI system from remote sites in order to contact connected parties through the master CTI system.

The system 10 also includes at least one distributed call center 40, which is located at at least one remote location. Each distributed call center 40 includes a distributed CTJ system 42 and a digital communication server 44. The digital communication server 44 interfaces the distributed CTI system 42 with the computer network 30. This allows each distributed CTI system 42 to interface with the master CTI system 22 over the computer network 30.

Each distributed CTI system is connected to at least one connected party 50 over local telephone lines 52 as will be discussed in further detail below. Accordingly, voice communications may be established between a connected party 50 via local telephone line 52, a remote call center 40, a data connection 46 interfacing the distributed call center 40 with a computer network 30, a data connection 32 interfacing the computer network with a master call center and ultimately to a master call center agent 26.

The system 10 may further include at least one slave call center 60, which includes a slave digital communications server 62 and a slave CTI system 64. The main difference between a slave call center 60 and a distributed call center 40 is that a slave call center is configured to provide additional call center agent resources, such as one or more slave agent workstations 66, whereas a distributed call canter 40 is configured to place outbound calls to connected parties 50. Each slave call center 60 may communicate with the master call center 20 via a data connection 68 to computer network 30 and data connection 32 between the master call center 20 and the computer network 30. Optionally, the master call center 20 may interface with the slave call center 60 over standard telephone lines 70 such as asynchronous transfer mode (ATM) lines, as is well known in the art.

Figure 2:
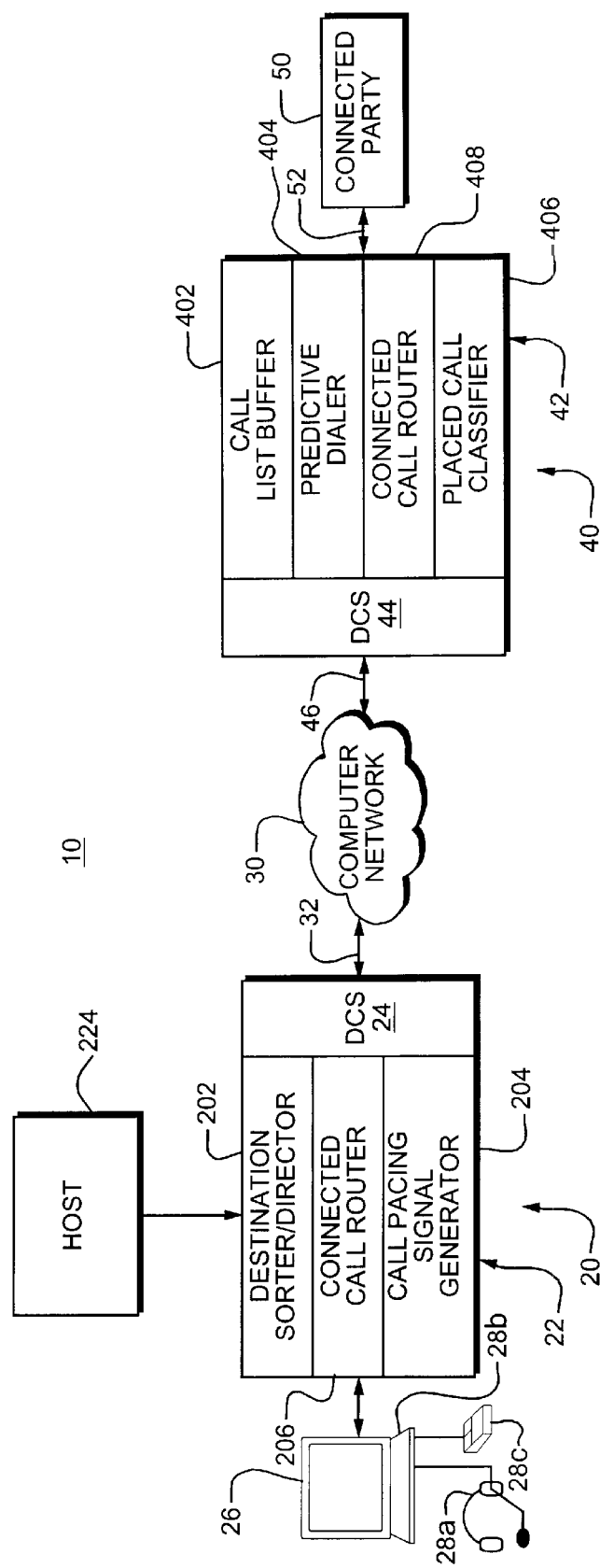
FIG. 2 is a more detailed block diagram of the components included in the master and distributed call centers of FIG. 1.

Turning now to FIG. 2, the components included in the master and distributed call centers are shown in more detail to facilitate the description of the operation of the system 10. In one embodiment of the invention, the master CTI system 22 includes a destination sorter/director 202, which may receive a call list including a plurality of call records from a host computer 204. As is well known to those skilled in the art, host computers, such as host 204, are routinely used to store call records in a data base-type format.

Each call record includes pertinent contact information regarding a potential or existing customer as well as pertinent information regarding a potential transaction. A call list includes a plurality of call records. For example, a call list may include a plurality of call records related to recent purchasers of homes. Each call record would include the name, address, and telephone number of the purchaser, as well as other pertinent information regarding the recent home purchase, such as price range or the like.

In any event, once a call list is obtained by the destination sorter/director 202, the destination sorter/director sorts the call list into one or more call list groups. In the preferred embodiment, the call list groups are sorted according to geographic territories. Then, each call list group is communicated to a desired distributed call center 40, which is preferably located at a desirable geographic location in order to coincide with the geographic locations of the parties to be contacted in the sorted call list group. The call list group is transmitted from the master call center 20 to the distributed call center 40 via computer network 30. In this manner, a principle object of the current invention, namely distributing the point of origin to minimize telephone line charges is accomplished.

Once a call list group is transmitted to a distributed call center 40, the call list group is stored in a call list buffer 402 where the call list is retained until a distributed call campaign is to be initiated. Then, at the designated time, a distributed call campaign is initiated at the distributed call center 40 using a predictive dialer 404.

As is well known in the art, a predictive dialer, such as predictive dialer 404 initiates telephone calls over local telephone lines 52 to the parties included in the call list group. As is also well known in the art, predictive dialers, such as predictive dialer 404, pace the rate of outbound calls according to a call pacing signal. A call pacing signal is based on a number of factors including, but not limited to, the number of available agents, the average length of a telephone call associated with a call campaign, the duration of connected calls, and others. However, in the system of the present invention, the call center agents interface with a master CTI system 22 at a master call center 20 and not directly with a distributed CTI system 42, which includes the predictive dialer 404. Accordingly, a novel aspect of the present invention is that the predictive dialer 404 at each distributed call center 40 receives a call pacing signal that is generated at the master call center 20 by a call pacing signal generator 204. The call pacing signal is then transmitted to each distributed call center 40 over the computer network 30 in much the same manner as a call list group is transmitted to each distributed call center.

In another embodiment of the invention, each distributed CTI system 42 also includes a placed call classifier 406 which is used to rapidly determine the status of a placed call at the distributed call center. In this manner, busy signals, answering machines, voice mail systems and the like can be rapidly identified and information regarding these calls immediately transmitted to predictive dialer in order to enhance the efficiency of each distributed call center 40. In this manner, time delays associated with transmitting call classification data from the distributed call center 40 to the master call center 20 over computer network 30 will be eliminated.

When a telephone call is answered by a live or "connected" party 50 over a local telephone line 52, then the distributed outbound telephony system of the present invention must rapidly connect the connected party 50 to an available agent 26 interfacing the master call center 20. This is accomplished by routing the connected call using a connected call router 408 at the distributed CTI system 42 to a connected call router 206 included in the master CTI system 22 over the computer network 30. The voice connection, which is received at the distributed call center 40 over a local telephone line 52 is converted into packets of digital information, which are transmitted over computer network 30 and reconstituted into audibly recognizable voice signals at the master call center and, in particular, master digital communications server 24. As is well known to those skilled in the art, digital packet data transmission protocols, such as Voice over Internet Protocol (VoIP), may be utilized for the actual transmission of voice data over the computer network 30.

Figure 3:
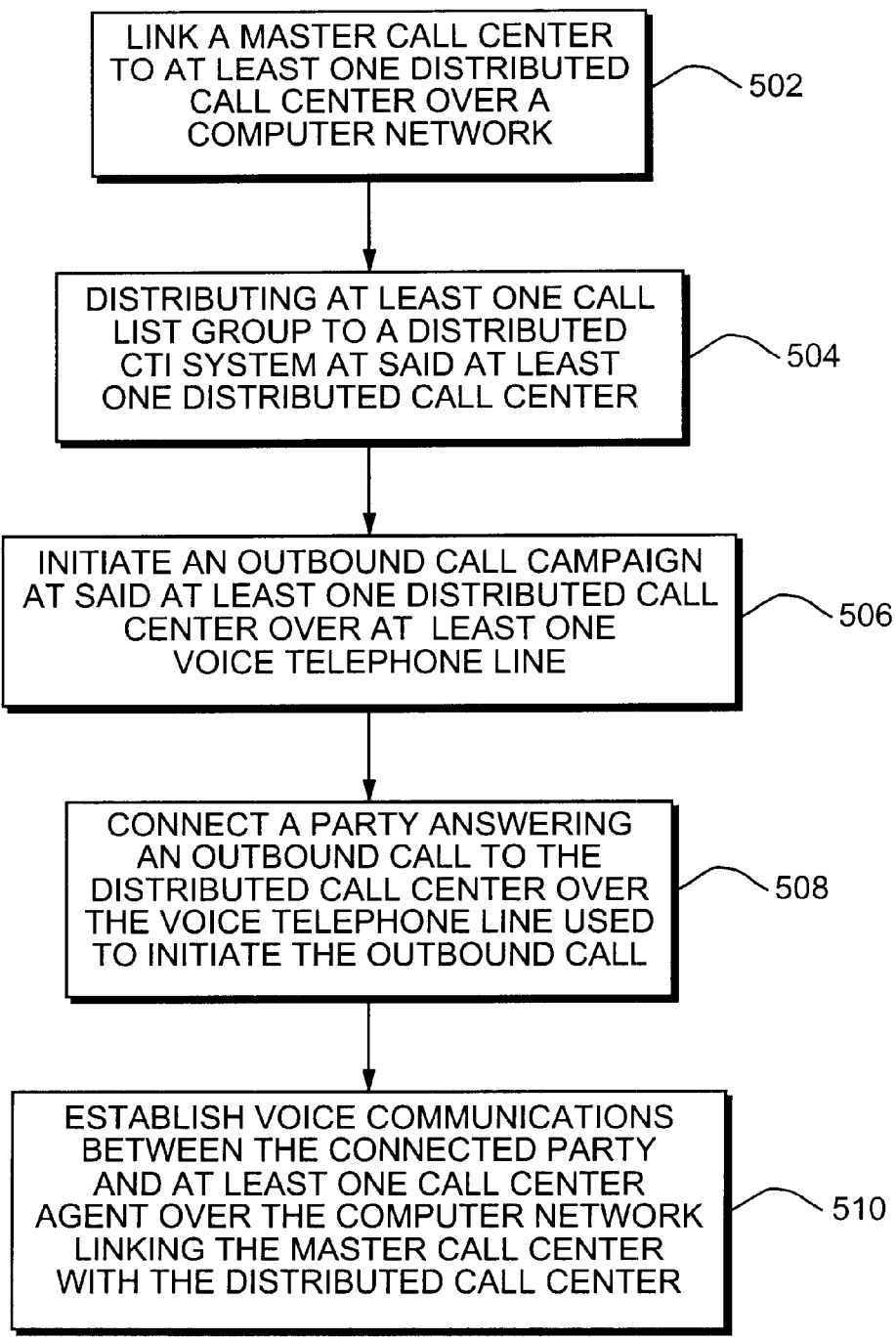
FIG. 3 is a flow diagram showing a method of distributing outbound telephony services over a computer network according to the present invention.

Turning now to FIG. 3, a method 500 of distributing outbound telephony services over a computer network is shown. The method begins by linking a master call center to at least one distributed call center over a computer network, step 502. Each distributed call center is preferably located according to geographic considerations whereby telephone line charges associated with long distance telephone calls can be reduced or, in some cases, eliminated. The master call center includes a master computer telephony (CTI) system and a least one master call center agent for handling voice communications with a connected party. Each distributed call center includes a distributed CTI system. In the preferred embodiment, the computer network utilized to link the master call center with the distributed call centers is the Internet. However, any suitable wide area network would be considered an equivalent.

Then, at least one call list group is distributed to at least one distributed CTI system at at least one distributed call center, step 504. As indicated above, preferably the distributed call center corresponds generally to a geographic parameter associated with the call list group distributed thereto.

At a designated time, an outbound call campaign is initiated at a distributed call center over at least one voice telephone line, step 506. In the preferred embodiment, an outbound call campaign is initiated using a predictive dialer included in the CTI system at the distributed call center initiating the outbound call campaign. As indicated earlier, since the call center agents associated with a call campaign are physically located remote from the distributed call center and are interfaced thereto through a master call center over a computer network, the predictive dialer located at the distributed call center initiates calls in response to a call pacing signal, which is generated at the master call center and, in particular, by a call pacing signal generator included in the master CTI system.

Once an outbound call campaign is initiated in step 508, a party answering an outbound call is connected to the distributed CTI system over the voice telephone line. Next, in step 510, voice communications are established between the connected party and at least one call center agent over the computer network linking the master call center with the distributed call center.

As indicated above, the computer network linking the master call center and the at least one distributed call center is preferably the Internet. Accordingly, the step of establishing voice communications between the connected party and at least one call center agent over the computer network preferably utilizes Voice over Internet Protocol (VoIP). Accordingly, voice communications are provided between a connected party and a call center agent over a voice telephone line connecting the connected party to the distributed call center. Then, the distributed CTI system converts the voice signal into packetized digital data, acceptable for transmission between the distributed call center to the master call center over the computer network linking the two. At the master call center, the packetized digital data is then reconstituted into an audible voice signal, which is routed to a call center agent.

In another embodiment of the invention, the method 500 further includes the step of linking the master call center to at least one slave call center. Each slave call center includes at least once slave call center agent. The purpose of the slave call centers is to handle overflow traffic from a master call center. In one embodiment, the master call center is linked to the slave call center over a computer network, which may be the same computer network linking the master call center to the distributed call center(s). However, another connection may provide equivalent results. For example, the master call center may be linked to a slave call center over a dedicated wide area network or even using standard telephone lines.

Accordingly, the disclosed system and method reduces or eliminates a significant amount of toll charges associated with long distance telephone calls ordinarily incurred by call centers initiating outbound call campaigns. The cost reduction is realized by a system and method of distributing the initiation of a call campaign to at least one distributed call center that geographically coincides with the location of the parties a call campaign is designed to contact. The disclosed system and method preferably utilizes the Internet as a computer network linking a master call center with plurality of distributed call centers, which may be located at major metropolitan areas located around the United States or at geographic locations dispersed around the world.

Modifications and substitutions by one of ordinary skill in the art are considered to be within the scope of the present invention which is not to be limited except by the claims which follow.

What is claimed is:

1. A system for distributing outbound telephony services, over a computer network comprising:

a master call center located at a first location, said master call center including a computer telephony integration (CTI) system a digital communication server and classifying means for receiving a call list and grouping the call list into one or more call list groups according to geographic parameters; and a plurality of distributed call centers located at remote locations from said master call center, each said distributed call center including a distributed CTI system and a digital communication server, wherein said classifying means respectively sends each call list group to an associated one of said plurality of distributed call centers, wherein each said distributed call center is connected to at least one connected party over a local telephone line and wherein communications are established between each said connected party and said master call center over said computer network.

2. The system of claim 1, wherein said computer network comprises the Internet.

3. The system of claim 1, wherein said distributed CTI system comprises a predictive dialer responsive to a call pacing signal received from said master call center over said computer network.

4. The system of claim 3, wherein said distributed CTI system further comprises a placed call classifier for rapidly determining the status of a placed call at the distributed call center.

5. The system of claim 1, wherein said communications establised between each said connected party and said master call center over said computer network comprises voice communications and wherein said master call center comprises at least one call center agent interfacing with each said connected party over said computer network.

6. The system of claim 5 further comprising at least one slave call center including a slave CTI system and a slave digital communication server, said slave call center including at least one slave call center agent for accepting overflow calls from said master call center over a communications link.

7. The system of claim 6, wherein said communications link comprises said computer network for exchanging voice and call record data between said master, slave and distributed call centers.

8. The system of claim 6, wherein said communications link comprises said computer network for exchanging voice and call record data between said distributed call centers and said master call center and for exchanging call record data between said master and slave call centers and wherein said communications link further comprises an asynchronous transfer mode (ATM) connection between said master and said slave call centers for exchanging voice data therebetween.

9. A method of distributing outbound telephony services over a computer network, said method comprising the steps of:

linking a master call center over a computer network to a plurality of distributed call centers remote from the master call center, wherein said master call center includes a master computer telephony integration (CTI) system and wherein each said distributed call center includes a distributed CTI system;

sorting, at said master call center, a master call list into a plurality of call list groups according to geographic parameters associated with a plurality of call records included in said call list;

respectively distributing each said,call list group to an associated one of said distributed CTI systems, each said distributed call center corresponding generally to a geographic parameter associated with said call list group distributed to the associated distributed CTI system;

initiating an outbound call campaign utilizing each of said plurality of distributed call centers over voice telephone lines;

connecting a party answering an outbound call initiated at one of said plurality of distributed call centers to said distributed CTI system over voice telephone line; and establishing communications between said connected party and said master call center over said computer network.

10. The method of claim 9, wherein said step of establishing communications between said connected party and said master call center over said computer network comprises establishing voice communications between at least one call center agent at said master call center and said connected party.

11. The method of claim 9, further comprising the step of establishing communications between said connected party and said master call center over said computer network comprises establishing data contact between said connected party and said master call center.

12. The method of claim 9, wherein said step of initiating a call campaign utilizing each of said plurality of distributed call centers comprises using a predictive dialer to initiate said outbound calls, said predictive dialer responsive to a call pacing signal received from said master CTI system over said computer network.

13. The method of claim 9, wherein said step of linking said master call center to said plurality of distributed call centers comprises establishing electronic communications between said call centers over the Internet.

14. The method of claim 9 further comprising the step of linking said master call center to at least one slave call center for handling overflow traffic from said master call center.

15. The method of claim 10 further comprising the step of linking said master call center to at least one slave call center including at least one slave call center agent for handling overflow voice communications from said master call center.

16. The method of claim 10, wherein said step of establishing voice communications between said connected party and said at least one call center agent over said computer network comprises using Voice over Internet Protocol (VoIP).

17. The method of claim 15, wherein said step of linking said master call center to said slave call center comprises establishing electronic communications between said master call center and said slave call center over said computer network.

18. The method of claim 17, wherein said step of linking said master call center to said slave call center further comprises establishing voice communications between said master call center and said slave call center.

19. The method of claim 18, wherein said step of establishing voice communications between said master call center and said slave call center comprises establishing voice communications over said computer network comprises establishing VoIP communications over an Internet.

20. The method of claim 18, wherein said step of establishing voice communications between said master call center and said slave call center comprises establishing voice communications over a standard telephone line connection.

* * * * *